United States Patent
Jardin et al.

(12) 
(10) Patent No.: US 6,338,526 B1
(45) Date of Patent: Jan. 15, 2002

(54) COVER OF AN OPENABLE MOTOR VEHICLE ROOF WITH A HEATING ELEMENT EMBEDDED IN ITS PLASTIC FRAME

(75) Inventors: Hans Jardin, Inning/Bachern; Michael Kölbl, Neuried, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/655,773

(22) Filed: Sep. 5, 2000

(30) Foreign Application Priority Data

Sep. 3, 1999 (DE) ......................................... 199 42 038

(51) Int. Cl.[7] .................................................. B00J 7/04
(52) U.S. Cl. ....................... 296/216; 219/203; 219/544
(58) Field of Search ...................... 296/216.06, 216.09; 219/203, 544

(56) References Cited

U.S. PATENT DOCUMENTS

| | | | | |
|---|---|---|---|---|
| 1,822,884 A | * | 9/1931 | Creighton | 219/203 X |
| 1,885,127 A | * | 11/1932 | Milette et al. | 219/203 |
| 1,916,895 A | * | 7/1933 | Rowe | 219/203 |
| 3,639,938 A | * | 2/1972 | Golden | 219/203 X |
| 3,807,791 A | * | 4/1974 | Boyer | 219/203 X |
| 4,738,482 A | * | 4/1988 | Bohm et al. | 296/216.09 |
| 4,845,344 A | * | 7/1989 | Price et al. | 219/203 X |
| 5,285,048 A | * | 2/1994 | Nakase | 219/203 |
| 5,466,037 A | * | 11/1995 | De Lena | 296/211 |

FOREIGN PATENT DOCUMENTS

| | | |
|---|---|---|
| DE | 12 16 128 | 5/1966 |
| DE | 35 00 436 | 8/1985 |
| DE | 197 20 389 | 8/1998 |

\* cited by examiner

Primary Examiner—Dennis H. Pedder
(74) Attorney, Agent, or Firm—Nixon Peabody LLP; David S. Safran

(57) ABSTRACT

A cover of an openable motor vehicle roof with a cover plate, an edge gap seal, and a peripheral plastic frame which is foamed or injected onto an edge side of the cover plate. The cover is provided with at least one heating element which is integrated into the plastic frame. In one embodiment, the heating element is a heating wire that is clipped into a recess provided on the plastic frame. In another embodiment, a reinforcing frame is embedded in the plastic frame and the heating element is attached to the reinforcing frame.

22 Claims, 2 Drawing Sheets

US 6,338,526 B1

COVER OF AN OPENABLE MOTOR VEHICLE ROOF WITH A HEATING ELEMENT EMBEDDED IN ITS PLASTIC FRAME

BACKGROUND OF THE INVENTION

1. Field of the Invention

The present invention relates to a cover of an openable motor vehicle roof with a cover plate, an edge gap seal, and a peripheral plastic frame which is foamed or injected onto the edge of the cover plate.

2. Description of Related Art

Covers for an openable motor vehicle roof are generally known, as shown for example, from the German patent DE 197 20 389 C1. When such a cover freezes up during the cold seasons, the cover adjustment function in the roof cutout is no longer ensured. In the case in which the cover is still movable, there is a danger that the seal which is provided around the cover plate or on the edge of the roof opening will be damaged during such movement because the seal is at least partially frozen tight. Another disadvantage of such a cover, which conventionally consists of glass or plastic, is its moderate heat insulation. Thus, cold emitted into the passenger compartment is perceived by the driver and passengers in the head area and is very unpleasant. Therefore, users often close the sliding head liner provided under the glass cover. This, however, greatly reduces the otherwise existing benefit of a glass roof in the form of additional light incidence from above.

The published German application DE 35 00 436 A1 discloses a glass cap roof which consists of a glass plate which is sealed by a sealing section along the peripheral edge of the vehicle roof cutout. The reference discloses that at least one heating wire is inserted into the sealing section between the glass cover and the roof cutout in the immediate vicinity of the edge gap in order to prevent the glass cap roof from becoming frozen solid. But here, the disadvantage is that the heating wire must be inserted into the sealing section in a relatively complex installation step. In addition, as the result of the elasticity of the sealing section and the heating wire's very limited stretching capacity, the heating wire is exposed to loads which can lead to tearing of the heating wire.

The published German application DE-AS 12 16 128 is also noted for disclosing an electrical heating device for a vehicle door in which an electrical heating wire of a resistance heating wire heating system is inserted into a groove of the door frame that surrounds the door recess and can be connected to the vehicle battery via an actuation contact.

SUMMARY OF THE INVENTION

In view of the above discussed prior art, the primary object of the invention is to provide a cover for an openable vehicle roof which is also operable in the cold seasons.

Another object of the present invention is to provide such a cover which is easy to install and service.

Yet another object of the present invention is to provide such a cover which is reliable and minimizes the heating wire's exposure to loads that can tear the heating wire.

These and other objects are achieved by providing an arrangement of a heating means in the plastic frame of the cover which is torsionally stiff to such an extent that the heating means located in it is not exposed to mechanical loading. Moreover, such arrangement of the heating means in the plastic frame allows comfortable and easy installation during manufacture of the cover, especially in the process of foaming-on the plastic frame, and optionally also during a subsequent installation step such as during service.

According to one advantageous embodiment of the present invention, there is a recess on the bottom and/or the outside of the plastic frame into which the heating element or heating means is clipped, the heating means being preferably in the form of a heating wire. Alternatively, the heating element can also be embedded directly into the material of the plastic frame at the same time as peripheral foaming is done, the heating element being embedded preferably near the bottom facing the interior. In one alternative embodiment, the heating element is attached to the reinforcing frame beforehand, i.e. before the material of the plastic frame is foamed onto the combination of the reinforcing frame and the cover plate. The heating element can be fixed to the reinforcing frame, for example, by means of cementing. However, in yet another embodiment, the heating element is housed in a plug-in receiver and the plug-in receiver is slipped onto the outside edge of the reinforcing frame.

By arranging the heating element on the bottom of the plastic frame and thus, in a position opposite to the head area of the driver and passenger, and preferably, when the heating element is made in the form of a heating coil, a "flat radiator" is attained so that the head area which is sensitive to heat is also heated. This results in increased comfort of the driver and the passengers in the cold seasons so that the sliding head liner can remain in the opened position.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENT

Figure 1:
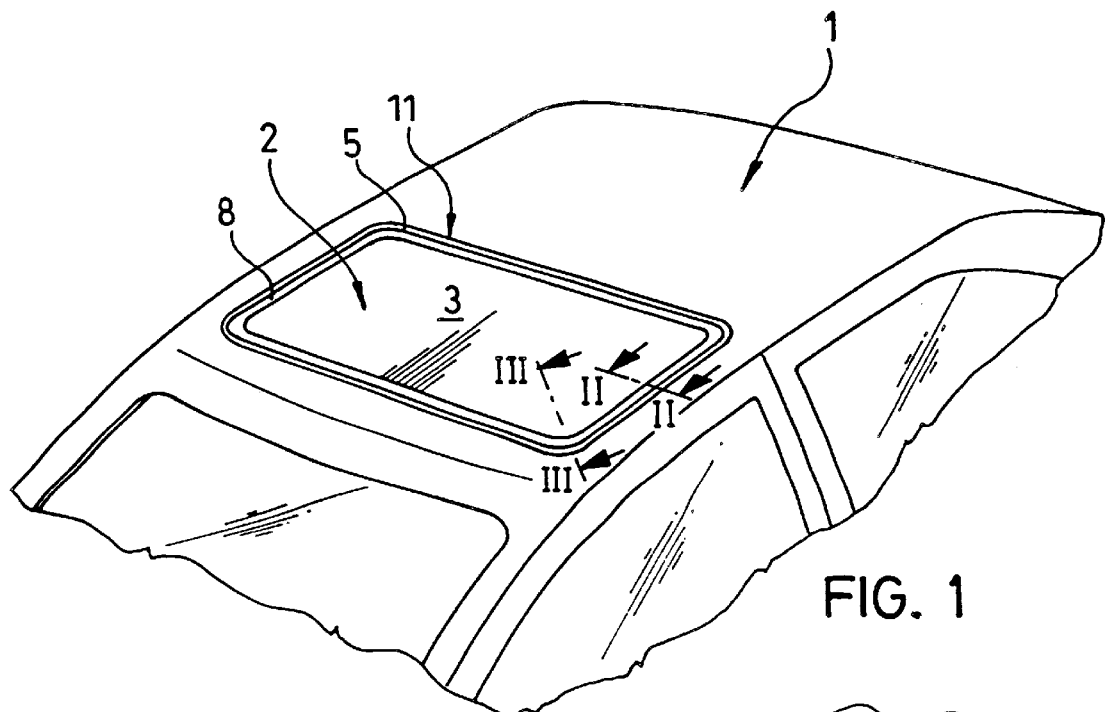
FIG. 1 shows a perspective overhead view of an openable vehicle roof with a cover in the closed position.

As can be clearly seen in FIG. 1, in a solid vehicle roof 1, there is provided a roof cutout 11 which can be closed by means of a cover 2. The cover can be at least partially cleared from the roof cutout 11 by raising the cover's 2 front or rear edge and/or by moving the cover 2. The cover 2 includes a cover plate 3 which is preferably made of a transparent material such as glass, a reinforcing frame 4 (see FIGS. 2 to 4) which is located underneath the cover plate 3, and a plastic frame 8 which connects the cover plate 3 and the reinforcing frame 4 by extrusion coating. The plastic frame 8 has a groove 7 on its outwardly pointing edge for holding a sealing profile 5 which is most clearly shown in FIG. 2. The sealing profile 5 fits into the groove 7 of the plastic frame 8 via a molding 6 which points inwardly, i.e towards the cover plate 3. The molding 6 has opposing undercuts 10 which interact with two projections 9 which are molded in a complementary manner on the plastic frame 8 such that the sealing profile 5 is held securely on the plastic frame 8 and can be removed only by vigorously pulling it out horizontally if replacement should be necessary. The sealing profile 5 forms an edge gap seal for sealing the cover 2 relative to the roof cutout 11.

Figure 2A:
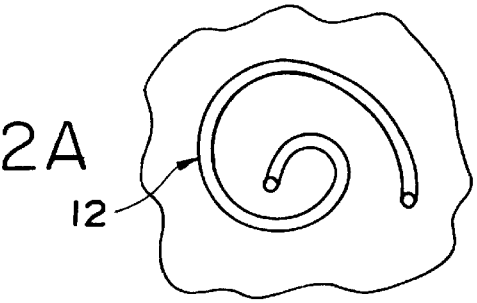
FIG. 2A is a plane view of the portion of the cover frame in the area in which a heating wire is located.
Figure 2:
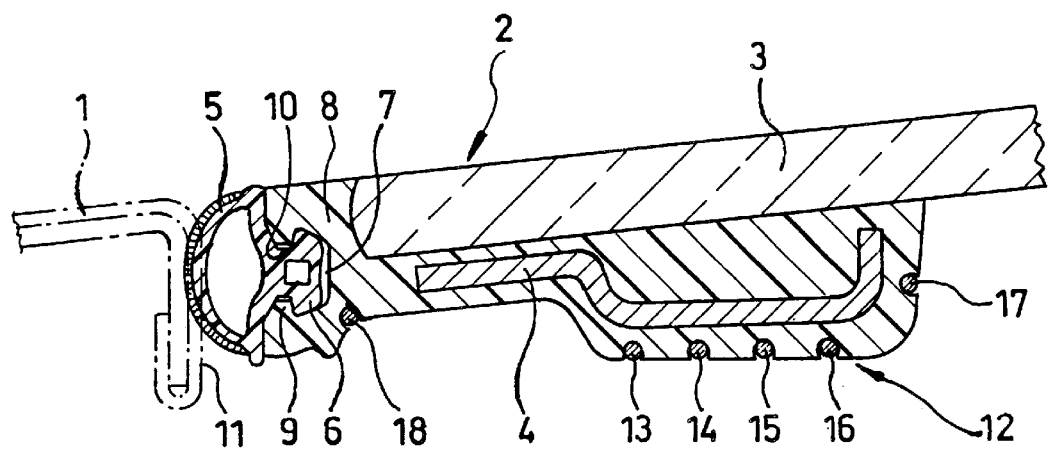
FIG. 2 shows a cross-sectional view of the cover in the edge area as viewed along the section line III—III in FIG. 1.

In accordance with one embodiment of the present invention as shown in FIG. 2, the plastic frame 8 includes an integrated heating coil, i.e. a heating element in the form of a heating wire which runs in a winding shape and is generally labeled with reference number 12. Thus, in the cross-sectional view of FIG. 2, the heating wire 12 is represented by the segments 13, 14, 15, 16 and 17. The heating wire 12 is embedded in a recess 23 which corresponds to the winding shape of the heating wire 12 and which is matched to the contour of the heating wire 12. This means that when the cross section of the heating wire 12 or of the heating wire segments 13 to 17 is cylindrical, the winding-shaped recess 23 in cross section has a circular shape. This recess 12 opens into the outside of the plastic frame 8 so that the heating wire 12 or the heating coil can be pressed into the recesses 23 during installation.

For the positioning of the heating wire 12, the inside area of the outside of the plastic frame 8 is chosen such that the heating wire 12 with the heating wire segments 13, 14, 15 and 16 points downwardly, i.e., in the direction toward the driver or passenger in the passenger compartment. In addition, another heating wire segment 17 is located on the inside lateral edge of the plastic frame 8. One purpose of the heating element, i.e. heating wire 12 which is located in the plastic frame 8 and which is positioned in this way, is to heat up the head area of the driver and the passengers more quickly to thereby contribute decisively to the comfort of the driver and the passengers by reducing the cold emission through the cover plate 3, such cold emission generally being perceived as very unpleasant. In addition, with this heating wire 12 or with the heating wire segments 13 to 17, heat is transferred into the area of the sealing profile 5 so that rapid thawing of the sealing edge is ensured and the seal on the roof cutout 11 does not stick to the components of the cover 3. This ensures that the cover 2 can be operated even during the cold seasons such as winter.

As can be seen, the heating wire 12 is located in the immediately vicinity of the reinforcing frame 4 which preferably consists of metal. Thus, the reinforcing frame 4 has good thermal conductivity and forms a heat bridge from the heating wire segments 13 to 17 to the sealing profile 5 thereby contributing to the transfer of heat from the heating wire segments 13 to 17 to the sealing profile 5. Optionally, another segment 18 of the heating wire 12 in the plastic frame 8 can be located in the immediately vicinity of the sealing profile 5 as also shown in FIG. 2 and thus, can be used to heat the sealing profile 5.

Figure 3:
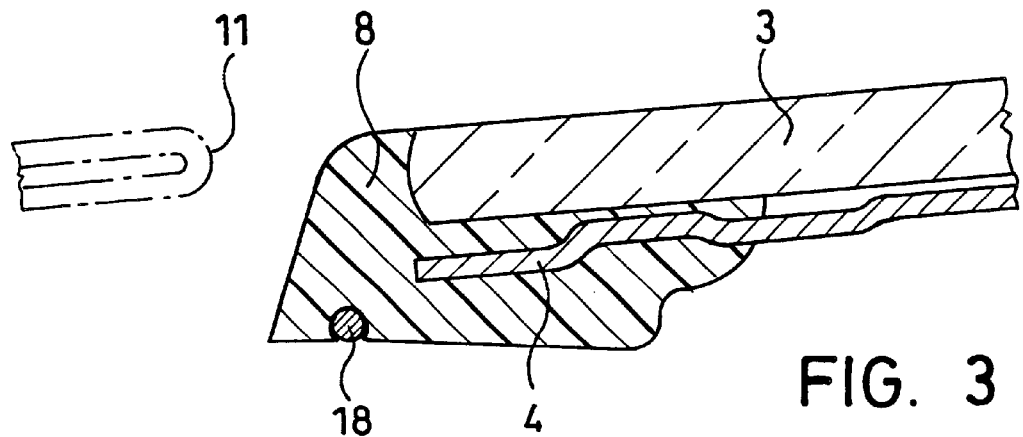
FIG. 3 shows a cross-sectional view of the cover in accordance with one embodiment of the present invention in the edge area as viewed along the section line II—II.
Figure 4:
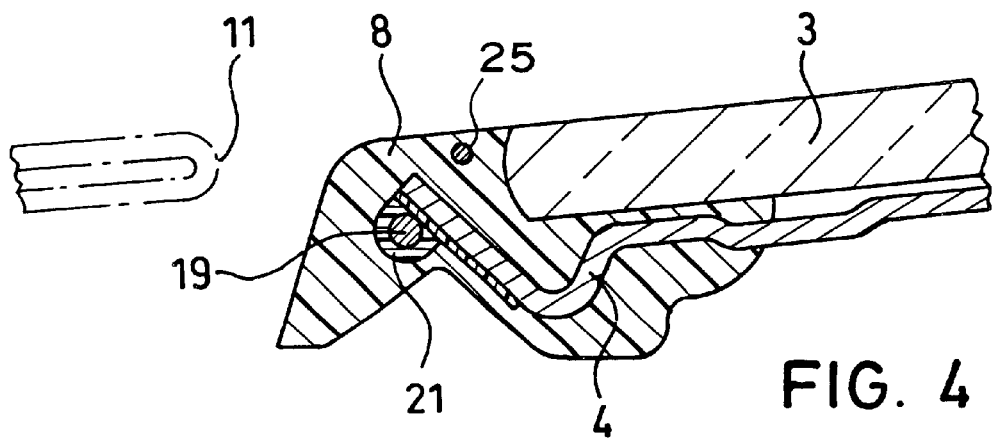
FIG. 4 shows a cross-sectional view of the cover in accordance with another embodiment of the present invention in the edge area as viewed along the section line II—II.
Figure 5:
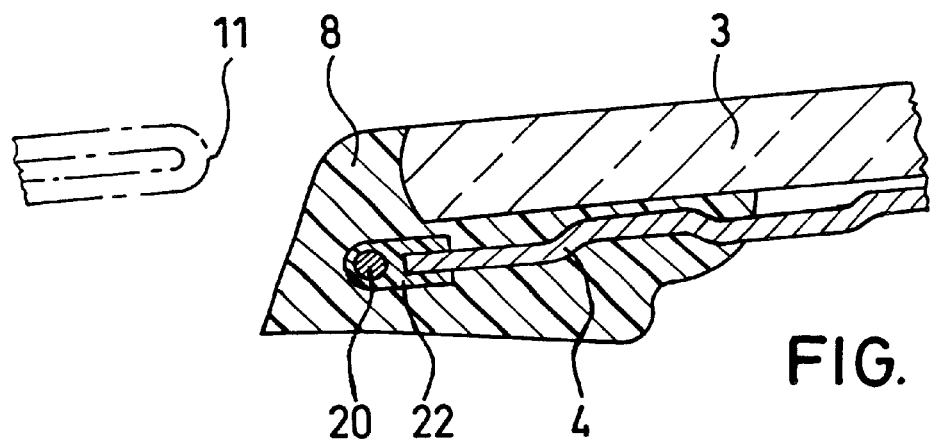
FIG. 5 shows a cross-sectional view of the cover in accordance with yet another embodiment of the present invention in the edge area as viewed along the section line II—II.

Alternative embodiments of the present invention for heating the cover 2 by means of a heating element located in the plastic frame 8 are shown in FIGS. 3 to 5, the corresponding elements being enumerated with the same numerals to thereby prevent confusion. These versions are not aimed at heating the interior or the head area of the driver and the passengers, but are used to transfer heat into the edge area of the cover 2 in order to prevent its sticking in the roof cutout 11 during the cold seasons such as winter. While FIGS. 3 and 5 show plastic frames 8 and reinforcing frames 4 with substantially similar cross sections, FIG. 4 shows a version which is different as can be seen from its profile. It should be noted however, that the profile shapes of the reinforcing frames 4 are not significant in practicing the present invention.

In FIG. 3, like the heating wire segments 13 to 17 in the embodiment of FIG. 2, a heating wire segment 18 is provided in the outside edge area toward the bottom of the plastic frame 8, the heating wire segment 18 being locked into a complementarily shaped recess 23 in the plastic frame 8. This recess 23, like the recess in the embodiment from FIG. 2, is produced in the peripheral foaming or injection process during which the plastic frame 8 is foamed or injected onto the combination of the cover plate 3 and the reinforcing frame 4. The heating wire 18 is then subsequently clipped into the complementarily shaped recess 23 in a separate step. Alternatively, the heating wire 18 can also be embedded during the peripheral foaming or injecting. The corresponding embodiments of the present invention which basically require that the heating wire 18 be embedded during the peripheral foaming or injection process are shown in FIGS. 4 and 5.

In the production of the cover in accordance with the embodiments shown in FIGS. 4 and 5, a heating wire 19, 20 of FIGS. 4 and 5 respectively, is fixed on the reinforcing frame 4 before the foaming-on process. While it is fundamentally possible for this purpose to cement the heating wire 19, 20 directly to the reinforcing frame 4, another approach can be taken as shown in FIGS. 4 and 5 in which the heating wire 19 and 20 is embedded in a plastic receiver 21, 22 in FIGS. 4 and 5 respectively. As is shown in FIG. 4, the plastic receiver 21 is a generally cylindrical element with a receiving cavity for receiving the heating wire 19 and a flattened connecting surface 24 for direct attachment to the reinforcing frame 4. The plastic receiver 21 can, for example, be cemented to a flat surface of the reinforcing frame 4 such as the outside end of the reinforcing frame 4 in the illustrated embodiment. As shown in the embodiment of FIG. 5, the plastic frame 22 may be made as a plug-in receiver and in the plug-in area, has a U-shaped cross section so that the plastic receiver 22 can be slipped onto the outside edge of the reinforcing frame 4 before peripheral foaming with the material of the plastic frame 8.

During winter, in a manner similar to that discussed relative to FIG. 2, heat is routed on a short path directly into the sealing profile 5 and the edge of the cover 2 by locating the heating wires 18, 19 and 20 in FIGS. 3, 4 and 5 respectively, in the immediate vicinity of the outside edge of the cover 2 or the plastic frame 8, i.e., immediately adjacent to the sealing profile (not shown in FIGS. 3, 4 and 5). In this way, a cover 2 which may be frozen tight during cold conditions quickly becomes free.

It should also be noted that instead of just individual heating wires, there can also be provided antenna wires 25 for reception of radio or TV, GPS signals or telecommunications. In addition, such antenna functions may also be superimposed on the heating wires so that the heating wires serve these other functions as well as their heating function.

In the manner discussed, by arranging the heating element such as the heating wire 12 on the bottom of the plastic frame 8, the present invention ensures that the cover 2 can be operated even during the cold seasons such as winter. In addition, by positioning the heating element opposite to the head area of the driver and passenger, a "flat radiator" is attained so that the head area is also heated to increase comfort of the driver and the passengers during the cold seasons.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

We claim:

1. Cover of an openable motor vehicle roof comprising:
   a cover plate;
   a peripheral plastic frame provided along an edge of said cover plate, said plastic frame being at least one of foamed onto said cover plate and injected onto said cover plate;
   an edge gap seal adapted to seal said cover;
   at least one heating element integrated into said plastic frame; and
   a reinforcing frame embedded in said plastic frame, wherein said heating element is attached to said reinforcing frame.

2. Cover of claim 1, wherein said heating element comprises a heating wire.

3. Cover of claim 1, wherein said heating element is routed in a winding shape.

4. Cover of claim 1, wherein said heating element is clipped into a recess provided on said plastic frame.

5. Cover of claim 1, wherein said reinforcing frame is made of a sheet metal.

6. Cover of claim 1, wherein said heating element is located on an outside edge of said reinforcing frame.

7. Cover of claim 1, wherein said heating element is cemented to said reinforcing frame.

8. Cover of claim 1, wherein said heating element is located in a plug-in receiver which is slipped onto an outside edge of said reinforcing frame.

9. Cover of claim 8, wherein said plug-in receiver is a plastic section part.

10. Cover of claim 2, wherein said heating wire is routed in a winding shape.

11. Cover of claim 10, wherein said heating wire is clipped into a recess provided on said plastic frame.

12. Cover of claim 11, wherein said heating wire is also an antenna adapted to receive signals.

13. Cover of claim 11, further comprising an antenna integrated into said plastic frame.

14. Cover of claim 11, wherein said reinforcing frame is made of a metal.

15. Cover of claim 14, wherein said heating wire is located on an outside edge of said reinforcing frame.

16. Cover of claim 15, wherein said heating wire is located in a plug-in receiver which is slipped onto an outside edge of said reinforcing frame.

17. Cover of claim 16, wherein said plug-in receiver is a plastic section part.

18. Cover of claim 1, wherein said heating element is also an antenna adapted to receive signals.

19. Cover of claim 1, further comprising an antenna integrated into said plastic frame.

20. Cover of an openable motor vehicle roof comprising:
    a cover plate;
    a peripheral plastic frame provided along an edge of said cover plate, said plastic frame being at least one of foamed onto said cover plate and injected onto said cover plate;
    an edge gap seal adapted to seal said cover; and
    at least one heating element integrated into said plastic frame;
    wherein at least a portion of the heating element is positioned on an inner side of the plastic frame facing toward at least one of a vehicle drive or passenger for warming of a head area thereof.

21. Cover of claim 20, wherein another portion of the heating element is located in a portion of the plastic frame that is in sufficient proximity to the edge gap seal for producing thawing of the edge gap seal.

22. Cover of an openable motor vehicle roof comprising:
    a cover plate;
    a peripheral plastic frame provided along an edge of said cover plate, said plastic frame being at least one of foamed onto said cover plate and injected onto said cover plate;
    an edge gap seal adapted to seal said cover; and
    at least one heating element integrated into said plastic frame;
    wherein at least a portion of the heating element is positioned in a portion of the plastic frame that is in sufficient proximity to the edge gap seal for producing thawing of the edge gap seal.

* * * * *